Patented Nov. 3, 1925.

1,560,346

UNITED STATES PATENT OFFICE.

CARL T. FULLER, OF NUTLEY, NEW JERSEY, ASSIGNOR TO GENERAL ELECTRIC COMPANY, A CORPORATION OF NEW YORK.

PLASTIC COMPOSITION AND METHOD OF USING IT.

No Drawing. Application filed January 20, 1922. Serial No. 530,653.

*To all whom it may concern:*

Be it known that I, CARL T. FULLER, a citizen of the United States, residing at Nutley, in the county of Essex, State of New Jersey, have invented certain new and useful Improvements in Plastic Compositions and Methods of Using Them, of which the following is a specification.

My invention relates to compounds or compositions which are cured or hardened by heating to a definite temperature, and also to a method for readily determining whether such compositions have been heated to the proper temperature. It relates more particularly to plastic compositions which may be molded or may be used for uniting or cementing objects, and which are hardened by heating. The cements which are used for securing the metal base to the bulbs of incandescent lamps are one example of the compositions to which my invention is particularly applicable.

Many compounds exhibit the property of being cured or hardened when heated to a critical temperature. One example of such a compound or composition is a partial or incomplete condensation product of phenol and formaldehyde, such as that sold commercially under the name of Bakelite, which is transformable into a final insoluble, infusible condensation product by heating to a definite temperature. The partial condensation product is plastic and easily molded into any desired shape, and is also capable of use as a cement for joining various objects, such as metal to glass. The extent of the transformation into the final insoluble condensation product depends upon the temperature to which every part of the product is brought. Other examples of such plastic compounds are the so-called basing cements used extensively for securing metal bases to the bulbs of incandescent lamps. These basing cements, commonly composed of some organic base mixed with more or less inert filler, are very soft and plastic at room temperature, but harden and adhere very firmly to glass and to metal when heated to the proper temperature. Heretofore, great difficulty has been experienced in determining by inspection whether such plastic compositions had been heated to the proper temperature to bring about the desired change, since there is practically no change in appearance produced by the heating, and a number of variable factors are present, such as the amount of moisture in the compound, and consequently heating under the same conditions does not always produce the same results.

One object of my invention is to provide a method for determining easily and accurately by inspection whether the plastic compound has ever been heated to the desired degree. Another object is to provide a simple and efficient method by which even an unskilled operator can determine by inspection whether the plastic composition has been heated to the desired temperature, so that instances of insufficient heating and incomplete transformation or hardening are easily detected. Another object is to provide a plastic composition of such a character that it will indicate unmistakably by its appearance after it cools to room temperature, whether it was heated to the proper temperature to cause curing or hardening. Still another object is to provide a plastic composition which is particularly suitable for use as a basing cement for incandescent lamps and similar purposes and which is of such a character that good results can be obtained with it by unskilled help in the factory.

In accordance with my invention I intimately incorporate with the plastic composition or cement a coloring material of such a character that its appearance does not change unless and until the plastic composition containing it attains the critical temperature for curing or hardening it, whereupon the coloring material permanently changes its appearance to a marked extent and thereby indicates clearly that the correct temperature has been attained by the plastic composition. I prefer to use a coloring material which exhibits a marked and permanent change in appearance within a comparatively narrow temperature range, as for example, some bright colored material which will fade out and become permanently colorless at the proper temperature. Most of the plastic compositions to which my invention is particularly applicable are composed of organic material or of organic material mixed with some inert filler, and I choose a coloring material which is inert chemically to that organic material and to the filler below the desired temperature. The coloring materials which I have found most desirable in the practice of my invention are organic dyes of such a composition that they become permanently colorless at temperatures corresponding to the best temperature for curing or hardening the plastic compositions. The dyes which I have found to be most suitable for this purpose are organic dyes of the triphenyl methane group which at the desired temperature either change color to a marked extent or become colorless, although I have obtained good results with other organic dyes of the diphenyl methane group.

One class of plastic compositions to which my invention is particularly applicable is the basing cements used to cement metal bases to incandescent lamp bulbs. These cements are very plastic and adhesive at room temperatures, but harden and firmly cement the metal base to the glass bulb of a lamp at temperatures of 150° to 260° C. One such cement which I have used with good success has an organic base consisting of a partial condensation product of phenol and formaldehyde which at 150° to 260° C. is transformable into the insoluble infusible condensation product to a sufficient extent to make a very desirable basing cement. In accordance with my invention I incorporate with this partial condensation product an indicator which for basing cement for incandescent lamps of the usual type is preferably an organic dye sold commercially under the name of malachite green, and belonging to the tri-phenol methane group. This dye imparts to the cement a bright green color which fades out permanently at about 180° C. which is the temperature to which the basing cement should be heated in order to obtain the best results. For some purposes it is desirable to heat the basing cement slightly higher and in such cases I prefer to use an organic dye known as methyl violet, which also belongs to the triphenyl methane group and imparts to the cement a color which fades out permanently at a temperature of about 220° C. Another organic dye suitable for use in place of methyl violet is known as auramine yellow, and belongs to the diphenyl methane group.

A small amount of the dye or indicator, just sufficient to color the composition, is sufficient. For example, I have obtained good results with a basing cement composed of about 50 pounds of a partial condensation product of phenol and formaldehyde, about 2½ to 4 pounds of denatured alcohol, and 8½ grams of malachite green dye. The dye is dissolved in the alcohol giving it a marked color, and then the partial condensation product is added to the alcohol in the form of powder in small amounts and thoroughly stirred until the mixture is of the consistency of dough.

Another basing cement with which good results have been obtained in the practice of my invention is composed of 20 pounds of a solution or emulsion of approximately equal parts of glue and shellac dissolved in about ten pounds of alcohol to which is added five pounds of dammar gum dust, about 75 pounds of marble flour, and 4 grams of the indicator, such as malachite green dye, dissolved in alcohol. The indicator or dye solution is added to the glue and thoroughly mixed after which the dammar dust is added and finally the marble flour, the whole being then thoroughly mixed to the proper consistency. Either of the above described basing cements can be thinned as desired, by adding a thinner composed of three parts of water to seven parts of denatured alcohol.

These basing cements will give good results when applied to the bases in the usual manner if the bases are heated for a period of between two or more minutes with the heating so adjusted that during this time of baking or heating the color of the cement fades out and disappears. Since the cements are made with an organic base it is possible to char them by overheating, which should be avoided. After the bases have been heated for two or more minutes until the color of the indicator has disappeared they should, to secure the best results, be allowed to cool down to less than 100° C. before handling. As the fading of these dyes is a function of time as well as temperature, the temperatures above given are only approximate, but are substantially correct if the bases are brought up to the given temperatures in about two or three minutes.

By the practice of my invention as above described, even unskilled operators can secure the best results uniformly and consistently under factory conditions, since all that is necessary to observe in order to know whether the plastic composition or cement has been subjected to the proper temperature is to observe its color. It is an easy matter to adjust the basing machines or the ovens so that the articles will be subjected to just the right heating to cause the color of the indicator to change or in the case of malachite green and methyl violet to disappear. Another marked advantage is that the inspector can tell at any time by the appearance of the finished articles whether the plastic composition in those articles was properly heated during manufacture.

For use with basing cements which are to be heated to about 180° C. I have obtained the best results with malachite green which produces a green cement that becomes practically colorless at that temperature and for those to be heated somewhat higher I prefer to use methyl violet or auramine yellow, which produce a cement that fades or changes color at about 220° C. My invention is not limited to the use of these dyes nor necessarily to dyes of the tri-phenyl methane group or the diphenyl methane group as any coloring material can be used which will at the temperature it is desired to indicate, show a marked and permanent change in color, or which preferably at that temperature loses its color entirely. I, therefore, do not wish my invention to be restricted to the use of any particular dye or coloring material, but intend to cover all changes and modifications within the scope of the appended claims.

What I claim as new and desire to secure by Letters Patent of the United States, is:—

1. A plastic composition comprising an organic compound capable of being cured or hardened without change in color by heating to a critical temperature and having intimately incorporated therein a coloring material which changes color permanently only when heated to said critical temperature at which said compound is cured or hardened.

2. A plastic composition containing plastic organic material capable of being hardened without change in color by heating to a critical temperature and having intimately incorporated therein a coloring material which becomes substantially and permanently colorless when heated to said critical temperature.

3. A plastic composition containing such partial condensation products of phenol and formaldehyde as are capable of transformation by heat and without change in color into insoluble, infusible condensation products and having intimately incorporated therein a coloring material which changes color permanently only at a temperature sufficiently high to cause said transformation of said partial condensation products.

4. An organic cement comprising a plastic organic material which hardens without change in color when heated to a critical temperature and having intimately incorporated therein a coloring material which changes color permanently only when said material is heated to said critical temperature at which said cement hardens.

5. A cement comprising a plastic material capable of being hardened without changing in color by heating to a temperature within a range of 150° C. to 220° C. and having intimately incorporated therein a coloring material which becomes substantially and permanently colorless at a temperature within said range.

6. A cement capable of being hardened by being heated to a temperature within a range of 150° C. to 220° C. and having intimately incorporated therewith a colored dye of the triphenyl methane group which becomes permanently colorless within said temperature range.

7. The method of uniting objects by means of a cement which hardens when heated to a definite temperature which consists in incorporating with said cement a coloring material which changes color permanently only when heated to the temperature at which the cement hardens, joining the objects by means of said cement containing said coloring material and heating said objects and the cement until the color of said material changes.

8. The method of cementing metal to glass by means of a cement which hardens when heated to a definite temperature which consists in intimately incorporating with the cement a colored material which changes color permanently only when heated to said temperature and heating said metal until said material in the cement changes color.

In witness whereof, I have hereunto set my hand this 16th day of January, 1922.

CARL T. FULLER.